(12) United States Patent
Zakrzewski et al.

(10) Patent No.: US 8,230,573 B2
(45) Date of Patent: Jul. 31, 2012

(54) HOSE CONNECTING METHOD AND CONNECTOR ARRANGEMENT

(75) Inventors: Thomas Zenon Zakrzewski, Rastatt (DE); Andreas Richard Hilgert, Sinzheim (DE); Markus Angelo Ullrich, Baden-Baden (DE); Ralph Peter Merkel, Rastatt (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 469 days.

(21) Appl. No.: 12/425,631

(22) Filed: Apr. 17, 2009

(65) Prior Publication Data

US 2009/0261580 A1 Oct. 22, 2009

(30) Foreign Application Priority Data

Apr. 18, 2008 (EP) ..................... 08103615

(51) Int. Cl.
*B21D 39/00* (2006.01)
*F16L 33/20* (2006.01)
(52) U.S. Cl. .................... 29/507; 285/258
(58) Field of Classification Search ............ 29/507, 29/608, 469, 469.5, 505, 506, 428, 234, 237; 285/258
See application file for complete search history.

(56) References Cited

U.S. PATENT DOCUMENTS

| 2,766,804 A | * | 10/1956 | Kaiser ........................... 29/237 |
| 2,902,299 A | | 9/1959 | Turner |
| 5,476,291 A | | 12/1995 | Reneau |

FOREIGN PATENT DOCUMENTS

| WO | WO01/46611 A1 | 6/2001 |
| WO | WO2006/040082 A2 | 4/2006 |

OTHER PUBLICATIONS

European Patent Office, Extended European Search Report dated Sep. 18, 2008, for Application EP08103615.4.

* cited by examiner

*Primary Examiner* — John C Hong
(74) *Attorney, Agent, or Firm* — Dykema Gossett PLLC

(57) ABSTRACT

A method for providing a hose pipe connection is disclosed. Embodiments of the method start with a pipe having an enlarged end portion. A sleeve is introduced into the end of the flexible hose. The sleeve has an inner diameter that is equal to the inner diameter of the hose. In an embodiment, the inner diameter of the sleeve is increased while the end of the hose is already placed on the sleeve. The hose fitted with the sleeve is then introduced into the enlarged end of the pipe. Crimping of the enlarged end will then secure the sleeve and the hose and provide a fluid tight and mechanically sturdy connection.

7 Claims, 3 Drawing Sheets

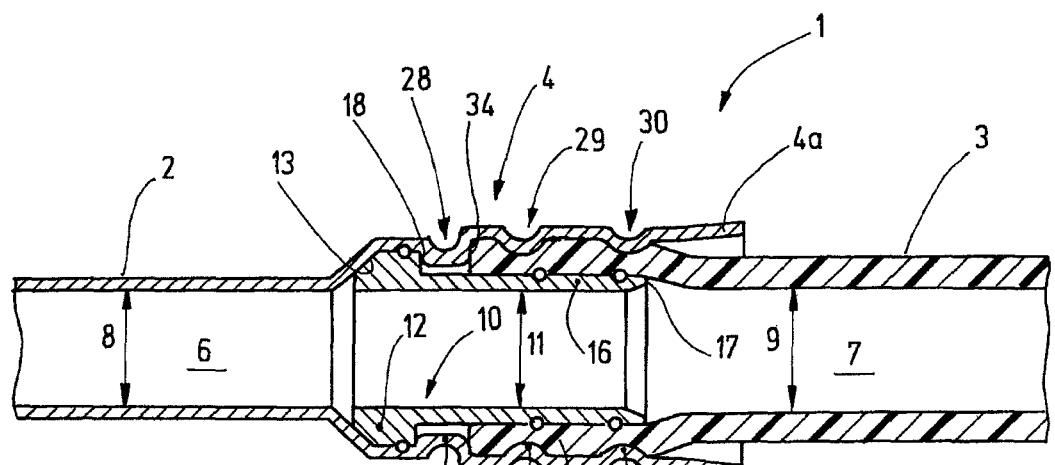
Fig.1
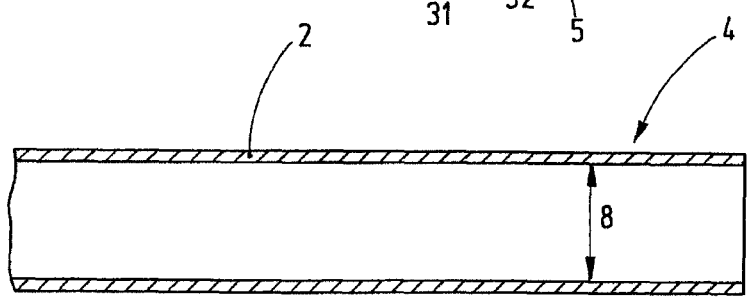
Fig.2
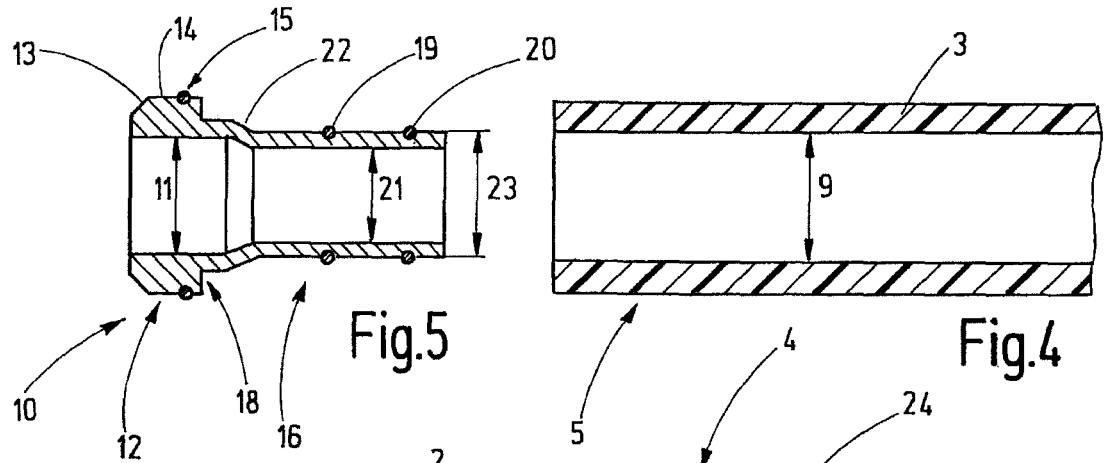
Fig.5
Fig.4
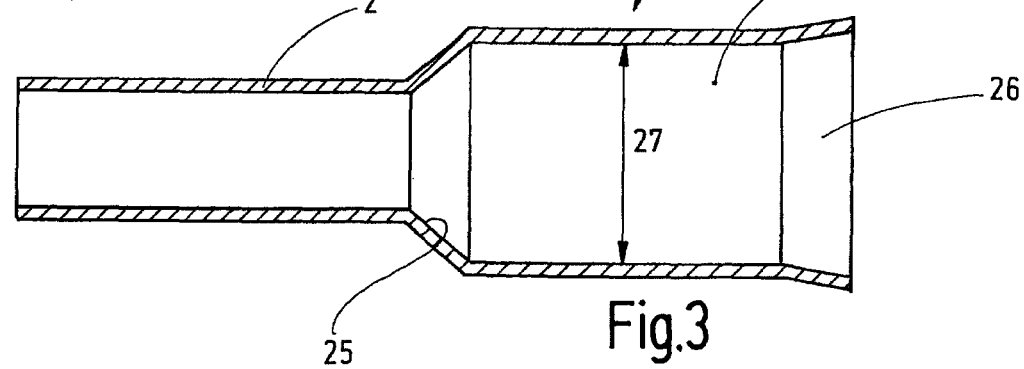
Fig.3

HOSE CONNECTING METHOD AND CONNECTOR ARRANGEMENT

CROSS-REFERENCE TO RELATED APPLICATIONS

This application claims priority to European application no. 08103615.4, filed 18 Apr. 2008. This European application is hereby incorporated by reference as though fully set forth herein.

BACKGROUND

Generally the invention relates to a method for connecting a flexible hose member to a socket and in particular for connecting the flexible hose member to a pipe member. Further the invention relates to a connecting arrangement for connecting a flexible hose member to a socket or a pipe member.

Flexible hoses and rigid pipes are used for conducting fluids such as oil, water, air and/or gas in several applications and in particular in automotive applications. Very often flexible hoses are to be connected to other elements e.g. end fittings, devices or pipes. The flexible hose is typically formed as a composite of different materials including plastic, elastomer, rubber, cords and wires or the like. The connecting technique should provide a reliable and sealed connection.

U.S. Pat. No. 2,902,299 refers to a hose coupling assembly having a metal sleeve of frustoconical form which is inserted in an end portion of the hose and is provided with outwardly pressed circumferentially extending rounded beads. The beads coact with shoulders of an internally stepped outer sleeve enclosing the end portion of the hose. The outer sleeve is provided with an external thread or forms a nut, so that two complemental outer sleeves can be provided which can be fastened together.

Another coupling assembly is shown in U.S. Pat. No. 5,476,291 with a male and a female section which can be threadably interconnected. Two hose ends can be affixed to the male and female section by means of a hub or a collar respectively each having an axial bore for receiving the hose end.

From WO 01/46611 A1 a coupling assembly for coupling two pipes is known. A coupling piece has a nipple, which is inserted and attached to the plastic pipe by means of radial expansion of the nipple. A nut is connected to the nipple. A coupling piece is screwed in to the metal pipe and provides an external thread to be threadably connected to the nut.

WO/2006/040082 discloses a tube connection which uses a specifically shaped pipe end which is inserted into the open end of a hose. A retainer serves to fasten the hose end to the tube end. The retainer is anchored to a flange of the tube and comprises two axially extending retaining limbs that are fastened on the outside of the tube by means of tightening straps. The retaining limbs rest between the outside of the tube and the tightening straps and are clamped there between.

While this assembly provides a reliable and inexpensive connection of the tube and the hose which is easy to produce, the inner diameter of the fluid channel may change at the transition from the tube to the hose. This is due to differing diameters of the pipe and the hose. If on the other hand a tube and a hose of the same inner diameter are used the specifically contoured pipe end has to be driven into the open end of the hose which might require high axial force and cause problems during production.

While this assembly is generally reliable a pipe connection arrangement is desirable which removes any inner shoulder or change of the inner diameter which could affect the fluid flow.

Therefore it is an object of the present invention to provide a pipe hose connection having a smooth inner shape.

SUMMARY

The invention uses a sleeve having a tubular portion of a primarily reduced diameter. After having inserted this portion into the open end of a hose, the portion will be expanded until the inner diameter thereof is equal to the inner diameter of the hose. This assembly secured within a socket provides a duct having an even inner wall. The sleeve forms a nipple which has an outer diameter that is larger than the inner diameter of the hose. The flexible hose may in particular include a steel braid or a yarn braid. While those braided hoses are flexible, in general, they are usually that stiff that they withstand all attempts to widen them. This is in particular true in view of tubes which comprise an inner inflexible lining, e.g. made of plastics. This type of linings is often used for tubes for aggressive fluid or fluids which otherwise would solve or permeate the elastomer body of the tube. The inventive method provides a way for placing the nipple within the hose while no axial relative movement of the nipple and the hose is necessary once the nipple and the hose are widened. The method produces an assembly having a smooth stepless inner wall and a uniform inner diameter.

The nipple can comprise further connecting means as there are flanges, inner or outer threads and so forth. So it can be fluidly connected to other hoses, pipes, fluid channels of apparatuses and assemblies.

The nipple may be secured within e shell or within a socket. In a preferred embodiment the socket is defined by an expanded pipe end which receives the hose end with the at least partially widened sleeve therein. After compressing zones of the pipe end the hose and the sleeve are fixedly secured therein. Preferably the inner diameter of the pipe is equal to the inner diameter of the sleeve after widening it. In short, the connecting arrangement is formed by a compressible pipe end socket, a flanged expandable sleeve and a hose clamped there between.

The hose pipe connecting arrangement will in particular avoid any restriction of a fluid flow and provide a very low pressure drop. It can be used for automotive air conditioning systems. Due to the reduced pressure drop the arrangement helps in increasing the efficacy and reducing the power consumption of the system the inventive arrangement is used in. Those systems may be air conditioning systems, hydraulic systems or the like. The inventive system is in particular useful in systems with fluids with high flow velocities.

The sleeve inserted into the open hose end defines the inner wall of the pipe connector. Moreover it provides an inner abutment for the flexible wall of the hose. The socket portion of the pipe end comprises inwardly deformed zones which press the wall of the hose against the outer circumferential surface of the sleeve. Consequently the hose is clamped between the sleeve and the socket and will be securely held. So, the invention provides both a durable mechanical connection and a tight seal. It is in particular made sure that the inner diameter of the channel will not be reduced by deforming the socket portion. The sleeve will prevent the hose from collapsing or even decreasing the cross section of the duct as a result of the application of inwardly directed compressing forces.

Preferably the tubular extension comprises a smooth cylindrical inner circumferential surface. Also it may have a smooth cylindrical outer surface. However the outer surface of the sleeve may be provided with fastening means for better securing the hose on the sleeve. To this end the outer surface may be provided with a serration, annular ribs, bulges, teeth, protrusions, indentations or the like.

A flange may be provided on one end of the sleeve. The flange may engage a compressed zone of a socket portion. This will help the joint to resist axial forces, stresses and vibrations and hence increase the reliability of the connecting arrangement.

Optionally sealing members may be placed on the sleeve on at least one of the elongate tubular portion and the flange portion. Sealing members may be omitted if the interface between the sleeve and the inner wall of the hose and the socket and the outer surface of the hose will provide a fluid tight seal anyway.

Further details and advantages embodiments of the invention are to be taken from the drawing, the description or the claims. The description is reduced to main topics of the invention and related facts as well.

BRIEF DESCRIPTION OF THE DRAWINGS

One illustrative embodiment of the invention will now be described by way of example with reference to the accompanying drawings in which:

FIG. 1 is a cross sectional view of the connecting arrangement according to the present invention;

FIG. 2 is a cross sectional view of a pipe end before deformation;

FIG. 3 is the pipe end partially expanded for forming a socket portion;

FIG. 4 is a cross sectional view of a hose end;

FIG. 5 is a cross sectional view of a sleeve having a tubular extended portion with reduced diameter;

DETAILED DESCRIPTION OF THE INVENTION

Figure 6:
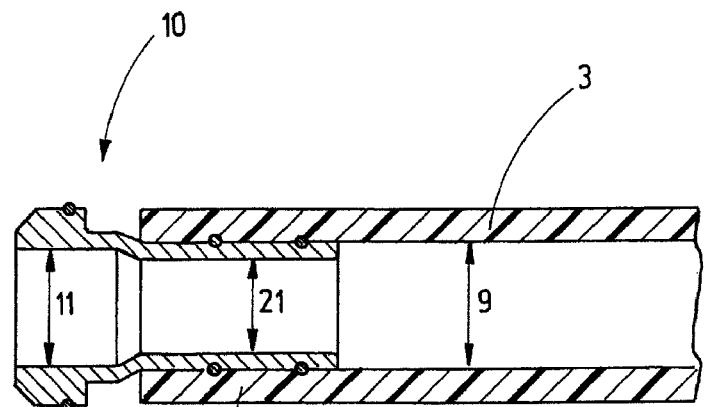
FIG. 6 is a cross sectional view of the sleeve inserted into the hose.

FIG. 1 illustrates a tube connecting arrangement undetachably connecting a pipe 2 and a hose 3. The pipe may be of any suitable type, e.g. a thin walled steel pipe. It may be consist of any suitable matter, e.g. steel, stainless steel, copper, aluminium or any other plastically deformable material. The hose 3 preferably consists of at least one sheet of an elastomeric material optionally reinforced by a textile material, steel wires or the like. The pipe 2 and the hose 3 both have end portions 4, 5 and ducts 6, 7 extending therefrom. The ducts 6 and 7 each have a diameter 8, 9. The diameter 8 is preferably equal to the diameter 9. The end portion 4 forms a socket receiving and mechanically securing end 5 therein. A flared out end 4a of the socket circumscribes the hose 3 in a radial distance and provides some protection of the hose 3.

The end portions 4 and 5 overlap and define a connecting region. A sleeve 10 is located within the connecting region and within the end portion 4 of pipe 2. The sleeve 10 comprises a through bore having a cylindrical wall defining a diameter 11. Diameter 11 is preferably equal to diameters 8 and 9. The outer circumferential surface of the sleeve may be smooth. Alternatively it may be provided with retainer means, e.g. ribs, bulges, teeth or the like which provide a form fitting engagement of the sleeve and the hose thereon.

The sleeve 10 comprises an annular flange 12 and a frustoconical end surface 13 provided thereon. The outer circumference of the flange 12 is defined by a cylindrical surface 14. Optionally at least one sealing element 15 may be provided in a groove intersecting the outer surface 14. The sealing element 15 may be any suitable preferably annular sealing element, e.g. an O-Ring or the like.

A tubular extension 16 extends from the flange 12 into the open end 5 of the hose 3. The tubular end 16 preferably ends on a rounded annular edge 17. A shoulder 18 may be provided between the flange 12 and the tubular extension 16. The tubular extension 16 may optionally carry one or several sealing elements, for example O-Rings 19, 20.

FIGS. 2, 4 and 5 illustrate the pipe 2, the hose 3, and the sleeve 10 before assembly. As to be seen, the sleeve 10 comprises a reduced diameter portion. A considerable length of tubular extension 16 has a reduced diameter 21 which is much lesser than diameter 11. A frustoconical transition zone 22 is located closed to the shoulder 18. The reduced diameter portion of the tubular extension 16 comprises an outer diameter 23, which is smaller than, equal to, or even slightly greater than the inner diameter 9. Preferably the diameter 23 is selected to facilitate inserting sleeve 10 into the open end 5 of the hose 3. FIG. 6 illustrates the assembly of the sleeve 10 and the hose 3.

While FIGS. 2 to 5 illustrate the pipe 2, the hose 3 and the sleeve 10 before assembly and deformation, the following will describe the assembling and deformation process for establishing the pipe connection of FIG. 1.

A first step involves flaring out of the end 4 of pipe 2 by expanding the cross section of end 4 of pipe 2. This expansion can be performed in a warm or cold metal working process by using any suitable technique. The end portion 4 defines a cylindrical inner wall 24 and a conical shoulder 25 between the cylindrical portion 24 and the pipe 2. The opposite end of the inner wall 24 may somewhat diverge. The end portion 4 is a socket for receiving the hose.

Figure 7:
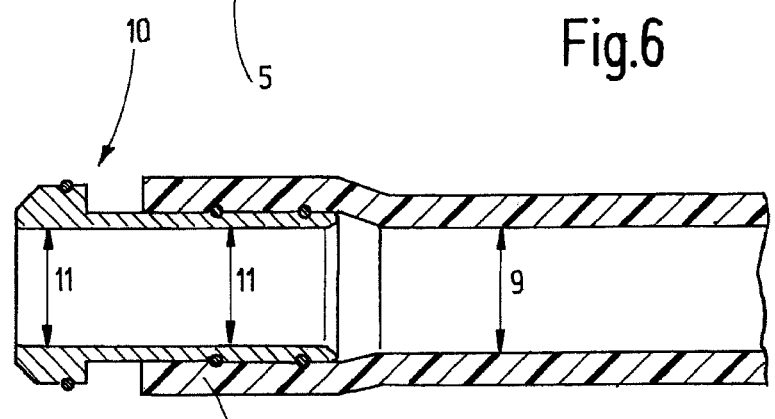
FIG. 7 is a cross sectional view of the arrangement according to FIG. 6 after expansion of the tubular extension.

Another step involves introducing the sleeve 10 as illustrated in FIG. 5 into the end 5 of the hose 3. A next step will involve expanding of the extension 16 and thus enlarge the diameter 21. This can be done by driving a mandrel or any other suitable tool into the through bore of the sleeve 10 to increase the diameter of the tubular extension 16. As a result the tubular portion 16 will have a uniform inner diameter as illustrated in FIG. 7. Preferably the sleeve 10 now has the same inner diameter 11 at both ends thereof. The end 5 of the hose 3 is somewhat widened.

While in the foregoing the expansion of the tubular extension of the sleeve 10 was illustrated, it is noted that it is also possible to start with a sleeve having a uniform reduced diameter 21. If this is the case the sleeve 10 will be expanded along its entire length.

Figure 8:
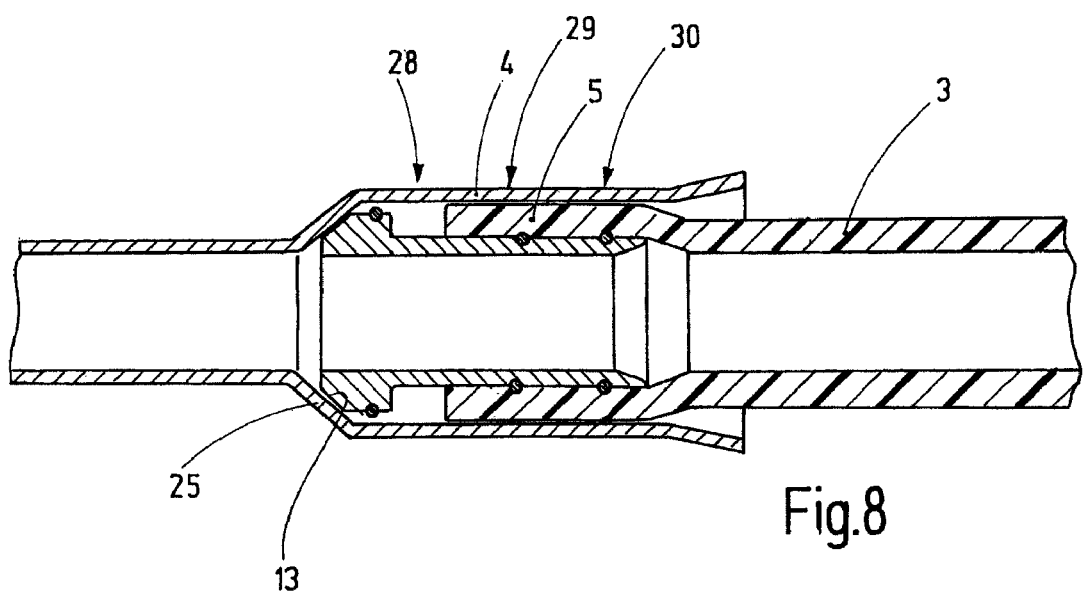
FIG. 8 is a cross sectional view of the connecting arrangement before compression of the socket portion of the pipe end.

After having provided the assembly of FIG. 7 in any of the above mentioned techniques it will be inserted into the expanded tubular socket portion 4 of pipe 2 as illustrated in FIG. 8. As to be taken from FIGS. 3 and 8, the inner diameter 27 of the socket portion 4, i.e. its bore, is preferably somewhat larger as the outer diameter of the outer circumferential surface 14 and/or the sealing element 15. Also, the diameter 27 is preferably somewhat larger than the outer diameter of the end portion 5 of hose 3. Consequently the hose sleeve assembly may be easily introduced into the socket portion 4 until the end surface 13 abuts on the conical shoulder 25.

A next step involves the deformation of the end portion 4 in order to transform it from the shape of FIG. 8 into the shape of FIG. 1. Radial inwardly directed forces will be applied in at least one, preferably some locations, preferably annular zones 28, 29, 30 and create annular grooves 31, 32, 33. Groove 31 fits between the shoulder 18 and end the surface 34 of the hose 3. The groove 31 axially secures the sleeve 10 and firmly connects it to the pipe 2. The grooves 32 and 33 clamp the end portion 5 against the outer circumferential surface of the tubular extension 16. Consequently the hose 3 is fixedly secured between the socket portion 4 of the pipe 2 and the tubular extension of the sleeve 10. The sleeve 10 will provide a firm abutment and prevent any reduction of the diameter 11 during the deformation of the socket portion.

Figure 9:
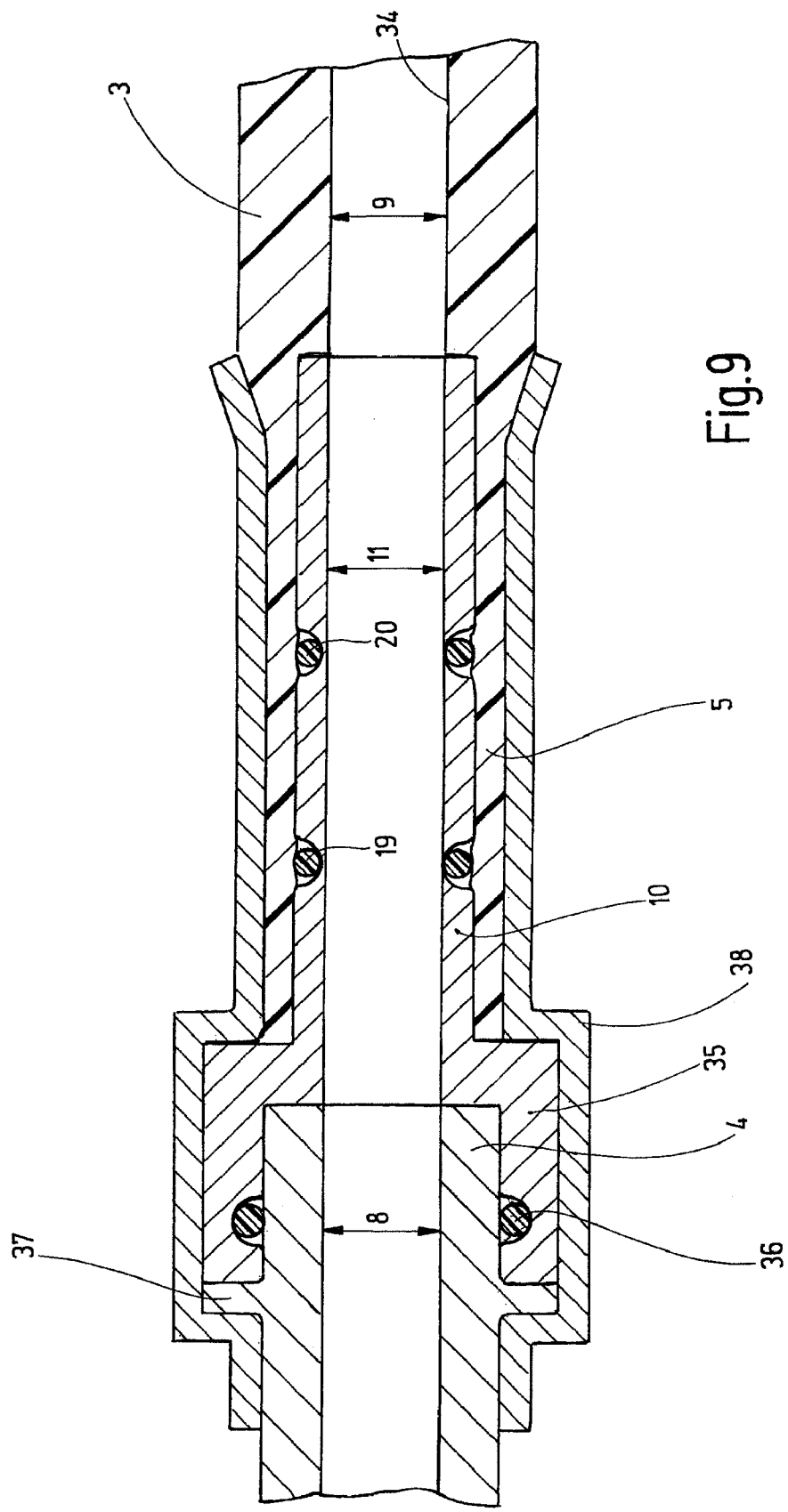
FIG. 9 is a cross sectional view of an alternative embodiment of the inventive connecting assembly.

FIG. 9 discloses another embodiment of the inventive hose pipe connection assembly similar to the one shown in FIG. 1. Like reference numbers refer to similar elements. The previous description is also valid for the embodiment of FIG. 9.

The sleeve 10 was fit into the open end while the outer diameter of the sleeve 10 was smaller than the diameter 9. Thereafter the sleeve 10 was widened so that the inner diameters 9 and 11 were made equal. The hose end 5 was widened without having to urge the hose onto a larger diameter nipple. The inventive method particularly provides a way for widening very stiff braided hoses, which additionally might be provided with a liner 34, in an easy and simple process. Moreover, it provides a way to fit the hose end 5 over the tubular portion of sleeve 10 without shaving the o-rings 19 and 20 or any other similar sealing element.

The sleeve 10 may comprise a socket end 35 which can receive the pipe end 4. A sealing element for example, o-ring 36 may be provided within an inner groove of this socket end 35 or an outer groove of the pipe end 4. The pipe end 4 may be provided with a radial flange 37 for securing the pipe end 4 on or in the socket end 35.

The whole assembly may be held together by retainer means which may be formed by a shell 38. In the preferred embodiment shell 38 is formed by a sleeve which is at least locally radially deformed and compressed for securing the hose end 5 at the widened portion of the sleeve 10 and for axially clamping flange 37 against the end surface of the socket end 35.

What is claimed is:

1. A method for connecting a flexible hose member to a socket, comprising:
provin a flexible hose member having at least one open end;
providing a sleeve having a first portion defining a larger inner diameter and a tubular portion which fits into the open end of the hose member, the tubular portion comprising a reduced diameter portion having a reduced inner diameter less than the larger inner diameter of the first portion;
placing the tubular portion of the sleeve within the open end of the hose;
expanding the tubular portion of the sleeve and the end of the hose to enlarge the reduced inner diameter so that the tubular portion has a uniform inner diameter throughout the length of the tubular portion;
providing an end portion of a rigid pipe member and expanding the end portion of the end of the pipe for forming a socket for receiving the hose end with the expanded tubular portion of the sleeve therein; and
introducing the hose end with the sleeve into the socket.

2. The method according to claim 1, additionally comprising:
providing a socket having a bore adapted to receive the end of the hose member, and placing the hose end with the sleeve received therein in the socket.

3. The method according to claim 1, wherein expanding the pipe end provides a hose receiving receptacle having an inner diameter which is larger than an outer diameter of the hose end.

4. The method according to claim 1, wherein inner diameters of the pipe and the hose are equal one to another.

5. The method according to claim 1, wherein expanding the tubular portion of the sleeve provides an inner diameter which is equal to the inner diameter of the hose member.

6. The method according to claim 1, further comprising at least locally reducing the diameter of the end of the pipe member.

7. The method according to claim 1, further comprising at least locally reducing the diameter of the end of the pipe member for providing a form fitting engagement of the pipe end and the sleeve and for clamping the hose member between the socket end and the sleeve.

* * * * *